(12) United States Patent
Seubert

(10) Patent No.: US 12,413,059 B2
(45) Date of Patent: Sep. 9, 2025

(54) OUTLET COVER HAVING A SHELF

(71) Applicant: Matthew Seubert, Shelby, MT (US)

(72) Inventor: Matthew Seubert, Shelby, MT (US)

( * ) Notice: Subject to any disclaimer, the term of this patent is extended or adjusted under 35 U.S.C. 154(b) by 241 days.

(21) Appl. No.: 18/217,860

(22) Filed: Jul. 3, 2023

(65) Prior Publication Data

US 2025/0015577 A1   Jan. 9, 2025

(51) Int. Cl.
*H02G 3/14* (2006.01)
*H02J 7/00* (2006.01)

(52) U.S. Cl.
CPC .............. *H02G 3/14* (2013.01); *H02J 7/0044* (2013.01)

(58) Field of Classification Search
CPC ................................. H02G 3/14; H02J 7/0044
USPC ........................................................... 174/66
See application file for complete search history.

(56) References Cited

U.S. PATENT DOCUMENTS

| | | | | |
|---|---|---|---|---|
| 3,113,996 | A * | 12/1963 | Sanford | H01R 13/60 |
| | | | | 174/67 |
| 7,812,257 | B2 * | 10/2010 | Gunderman | H02G 3/14 |
| | | | | 174/67 |
| 8,864,517 | B2 * | 10/2014 | Cohen | H02M 7/08 |
| | | | | 439/652 |
| 9,065,263 | B2 * | 6/2015 | Porcano | H01R 13/447 |
| 11,456,585 | B1 * | 9/2022 | Baldwin | G06F 1/1632 |
| 2011/0129722 | A1 * | 6/2011 | Yoneda | H01M 50/417 |
| | | | | 29/623.2 |
| 2011/0132634 | A1 * | 6/2011 | Fetzer-Westmeister | ....... |
| | | | | H02G 3/14 |
| | | | | 174/66 |

* cited by examiner

*Primary Examiner* — Timothy J Thompson
*Assistant Examiner* — Michael F McAllister
(74) *Attorney, Agent, or Firm* — The Iwashko Law Firm, PLLC; Lev Ivan Gabriel Iwashko

(57) ABSTRACT

An outlet cover, including a cover plate removably connected to at least one electrical outlet and surrounding the at least one electrical outlet, and at least one shelf disposed on at least a portion of the cover plate to receive at least one of a plug and a mobile device thereon.

4 Claims, 3 Drawing Sheets

OUTLET COVER HAVING A SHELF

BACKGROUND

1. Field

The present general inventive concept relates generally to an outlet cover, and particularly, to an outlet cover having a shelf.

2. Description of the Related Art

An electrical outlet or socket are used as a connector on a piece of equipment and/or a building. Generally, the electrical outlet is used to connect to a plug that is a part of an electrical device. As such, the electrical device can receive power from the electrical outlet while the plug is connected into the electrical outlet.

However, the connection between the plug and/or the electrical outlet is often not secure. The plug, such as a cell phone charger, is prone to falling out either on its own and/or after being jostled by a person and/or an animal. Despite carefully securing a plug in an outlet, many times individuals will find out that the plug falls out minutes after the fact. Aside from being incredibly inconvenient, an unsteady plug can also cause an electrical hazard.

Therefore, there is a need for an outlet cover having a shelf to ensure the plug remains connected to the electrical outlet.

SUMMARY

The present general inventive concept provides an outlet cover having a shelf.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an outlet cover, including a cover plate removably connected to at least one electrical outlet and surrounding the at least one electrical outlet, and at least one shelf disposed on at least a portion of the cover plate to receive at least one of a plug and a mobile device thereon.

The at least one shelf may include a support surface movably disposed on at least a portion of the cover plate to receive at least one of the plug and the mobile device thereon, and a movable wall be movably disposed on at least a portion of the support surface to move from retracted against the support surface in a first position to extended away from the support surface in a second position, and move from extended away from the support surface in the second position to retracted against the support surface in the first position, such that the movable wall prevents movement of at least one of the plug and the mobile device while the movable wall is extended.

The at least one shelf may further include a first support bracket movably disposed at a first end of the support surface to support the first end of the support surface while the support surface is extended, and a second support bracket movable disposed at a second end of the support surface to support the second end of the support surface while the support surface is extended.

The first support bracket and the second support bracket may extend the support surface away from the cover plate using a spring in response to depressing the support surface while the support surface is retracted against the cover plate.

The support surface may have an adhesive substrate disposed thereon to prevent movement of at least one of the plug and the mobile device off the support surface.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Outlet Cover 100
Cover Plate 110
Shelf 120
Support Surface 121
Adhesive Substrate 121*a*
Movable Wall 122
Hinge 123
First Support Bracket 124
First Spring 124*a*
Second Support Bracket 125
Second Spring 125*a*

Figure 1A:
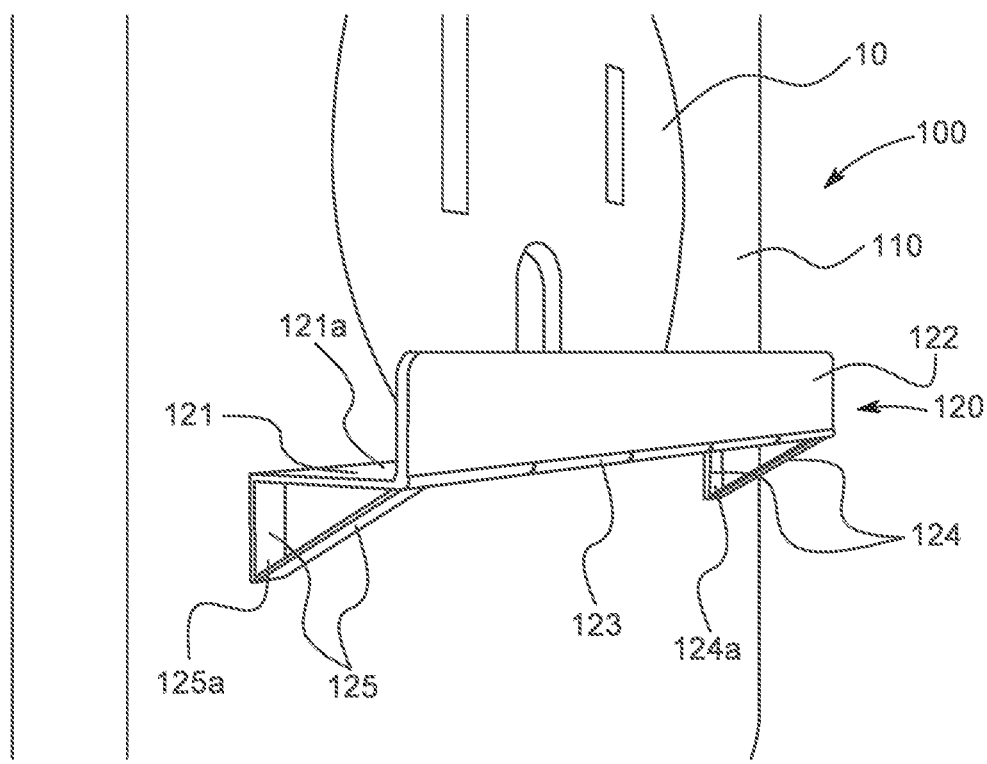
FIG. 1A illustrates a side perspective view of an outlet cover with a shelf in an extended position, according to an exemplary embodiment of the present general inventive concept.

FIG. 1A illustrates a side perspective view of an outlet cover 100 with a shelf 120 in an extended position, according to an exemplary embodiment of the present general inventive concept.

Figure 1B:
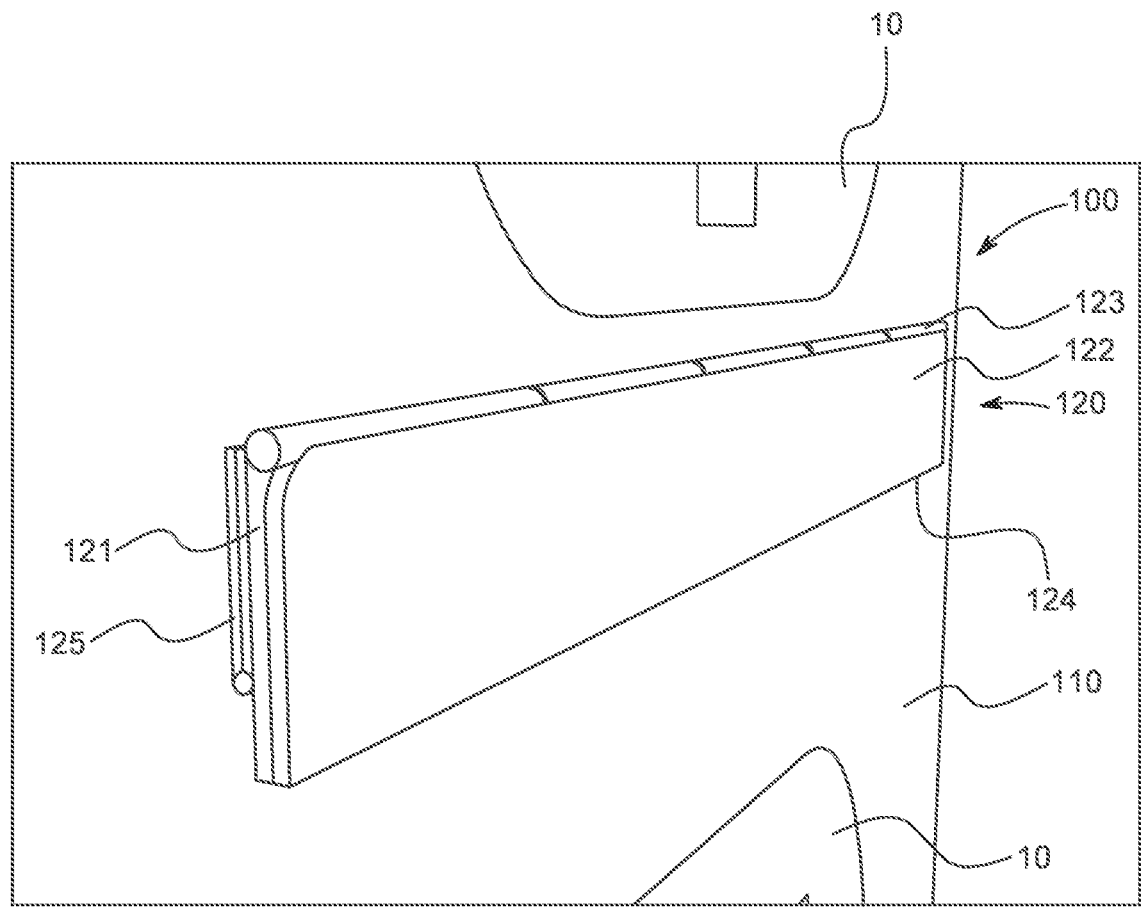
FIG. 1B illustrates a side perspective view of the outlet cover with the shelf in a retracted position, according to an exemplary embodiment of the present general inventive concept.

FIG. 1B illustrates a side perspective view of the outlet cover 100 with the shelf 120 in a retracted position, according to an exemplary embodiment of the present general inventive concept.

The outlet cover 100 may be constructed from at least one of metal, plastic, wood, and rubber, etc., but is not limited thereto.

The outlet cover 100 may include a cover plate 110 and at least one shelf 120, but is not limited thereto.

The cover plate 110 may be designed to removably cover and/or surround at least one electrical outlet 10 (i.e., socket) on a wall and/or an object. For example, the cover plate 110 may cover two electrical outlets 10, three electrical outlets 10, and/or four electrical outlets 10. In other words, the cover plate 110 may be constructed and/or configured to cover any number of electrical outlets 10. Moreover, the cover plate 110 may obstruct and/or prevent access to electrical wiring and/or circuitry connected to the at least one electrical outlet 10 to prevent injury to a user.

The at least one shelf 120 may include a support surface 121, a movable wall 122, a hinge 123, a first support bracket 124, and a second support bracket 125, but is not limited thereto.

The support surface 121 may be movably (i.e., pivotally, rotatably) disposed on at least a portion of the cover plate 110. Referring to FIGS. 1A and 1B, the support surface 121 may move from retracted against the cover plate 110 in a first position to extended away from the cover plate 110 in a second position. The support surface 121 may be disposed in parallel with the cover plate 110 in the first position and/or angularly (e.g., perpendicularly) disposed away from the cover plate 110 in the second position. Conversely, the support surface 121 may move from extended away from the cover plate 110 in the second position to retracted against the cover plate 110 in the first position.

The support surface 121 may receive a plug thereon. More specifically, the support surface 121 may hold and/or support the plug while the plug is inserted into the at least one electrical outlet 10. As such, the support surface 121 may prevent the plug from falling out of the at least one electrical outlet 10.

Alternatively, and/or in addition thereto, the support surface 121 may receive a mobile device, such as a cell phone, a smart phone, a tablet computer, thereon. Thus, the support surface 121 may be used to facilitate charging of the mobile device while the mobile device is connected via a plug to the at least one electrical outlet 10.

Furthermore, the support surface 121 may have an adhesive substrate 121*a* (e.g., tape, glue) disposed thereon. The adhesive substrate may increase a resistance level of movement of the plug, such that the plug and/or the mobile device is prevented from sliding off the support surface 121.

The movable wall 122 may be movably (i.e., pivotally, rotatably) disposed on at least a portion of the support surface 121. Referring again to FIGS. 1A and 1B, the movable wall 122 may move from retracted against the support surface 121 in a first position to extended away from the support surface 121 in a second position. The movable wall 122 may be disposed in parallel with the support surface 121 in the first position and/or angularly (e.g., perpendicularly) disposed away from the support surface 121 in the second position. Conversely, the movable wall 122 may move from extended away from the support surface 121 in the second position to retracted against the support surface 121 in the first position.

The movable wall 122 may prevent lateral movement of the plug and/or the mobile device on the support surface 121 while the plug is inserted into the at least one electrical outlet 10 and/or disposed on the support surface 121 in response to the movable wall 122 being in the extended position. In other words, the movable wall 122 may form a barrier to obstruct movement of the plug.

The hinge 123 may be disposed between the support surface 121 and/or the movable wall 122. The hinge 123 may facilitate movement of the movable wall 122 with respect to the support surface 121.

The first support bracket 124 may be movably (i.e., slidably) disposed at a first end of the support surface 121. The first support bracket 124 may move from retracted against the cover plate 110 in a first position to extended away from the cover plate 110 in a second position. Conversely, the first support bracket 124 may move from extended away from the cover plate 110 in the second position to retracted against the cover plate 110 in the first position.

The second support bracket 125 may be movably (i.e., slidably) disposed at a second end of the support surface 121 opposite with respect to the first end. The second support bracket 125 may move from retracted against the cover plate 110 in a first position to extended away from the cover plate 110 in a second position. Conversely, the second support bracket 125 may move from extended away from the cover plate 110 in the second position to retracted against the cover plate 110 in the first position.

Alternatively, and/or in addition thereto, the first support bracket 124 and/or the second support bracket 125 may be springingly disposed on the support surface 121, such that a first spring 124*a* and/or a second spring 125*a* may be triggered in response to depressing the first support surface 121 a first time toward the cover plate 110, such that the first support surface 121, the first support bracket 124 and/or the second support bracket 125 are extended away from the cover plate 110. After use, the first support surface 121, the first support bracket 124, and/or the second support bracket 125 may be depressed a second time toward the cover plate 110 to be locked against the cover plate 110 during storage.

Collectively, the first support bracket 124 and/or the second support bracket 125 may support the support surface 121 while the support surface 121 is extended (e.g., fully extended) away from the cover plate 110. Moreover, the first support bracket 124 and/or the second support bracket 125 may collapse and/or fold to allow the support surface 121 to retract against the cover plate 110 during storage.

Figure 2:
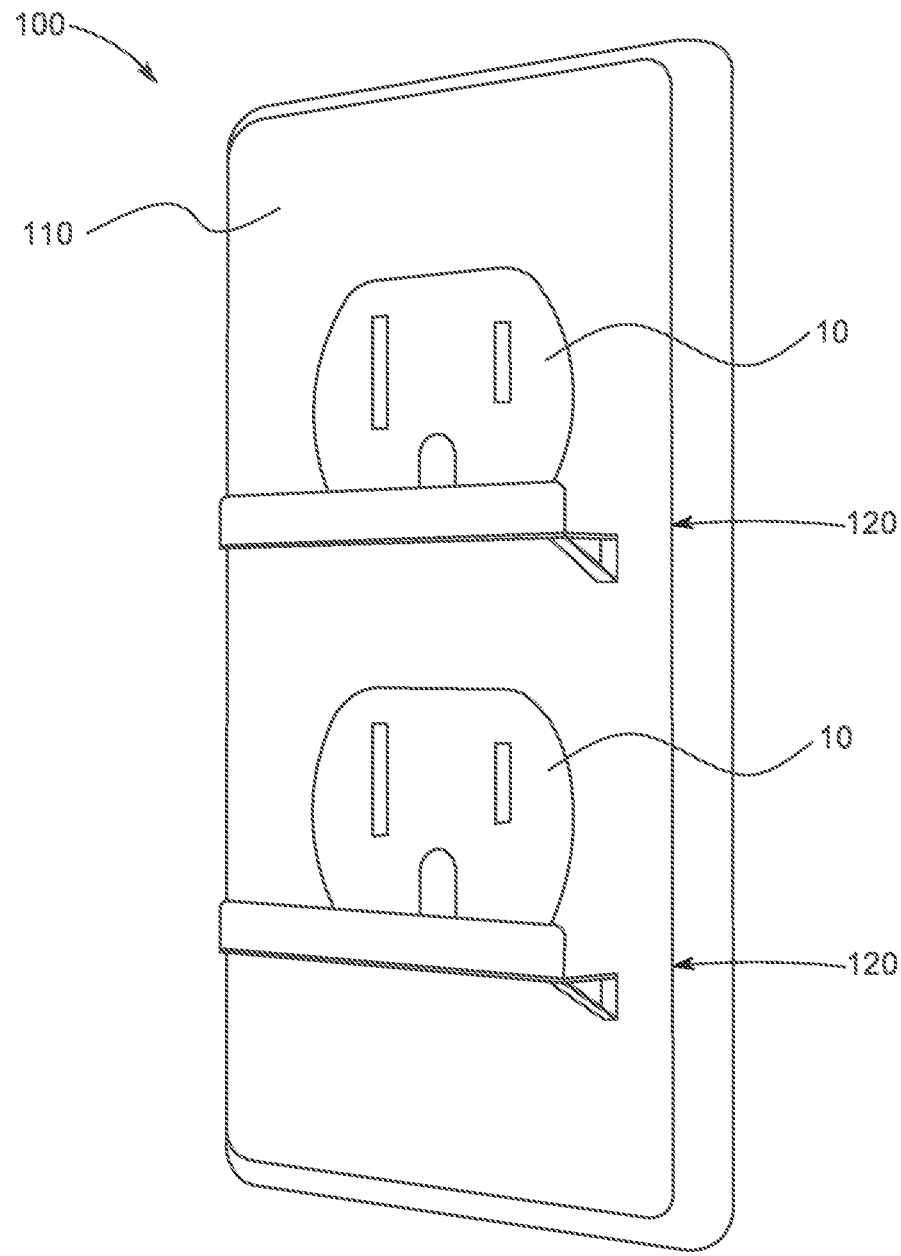
FIG. 2 illustrates a front perspective view of the outlet cover, according to an exemplary embodiment of the present general inventive concept.

FIG. 2 illustrates a front perspective view of the outlet cover 100, according to an exemplary embodiment of the present general inventive concept.

Referring to FIG. 2, the at least one shelf 120 may be disposed on the cover plate 110 adjacent to each electrical outlet 10.

Therefore, the outlet cover 100 may allow the mobile device and/or the plug to be stored on the at least one shelf 120 while connected to the at least one electrical outlet 10. Also, the at least one shelf 120 may prevent the plug from moving away from the at least one electrical outlet 10.

The present general inventive concept may include an outlet cover 100, including a cover plate 110 removably connected to at least one electrical outlet 10 and surrounding the at least one electrical outlet 10, and at least one shelf 120 disposed on at least a portion of the cover plate 110 to receive at least one of a plug and a mobile device thereon.

The at least one shelf 120 may include a support surface 121 movably disposed on at least a portion of the cover plate 110 to receive at least one of the plug and the mobile device thereon, and a movable wall 122 be movably disposed on at least a portion of the support surface 121 to move from retracted against the support surface 121 in a first position to extended away from the support surface 121 in a second position, and move from extended away from the support surface 121 in the second position to retracted against the support surface 121 in the first position, such that the movable wall 122 prevents movement of at least one of the plug and the mobile device while the movable wall 122 is extended.

The at least one shelf 120 may further include a first support bracket 124 movably disposed at a first end of the support surface 121 to support the first end of the support surface 121 while the support surface 121 is extended, and a second support bracket 125 movable disposed at a second end of the support surface 121 to support the second end of the support surface 121 while the support surface 121 is extended.

The first support bracket 124 and the second support bracket 125 may extend the support surface 121 away from the cover plate 110 using a spring in response to depressing the support surface 121 while the support surface 121 is retracted against the cover plate 110.

The support surface 121 may have an adhesive substrate disposed thereon to prevent movement of at least one of the plug and the mobile device off the support surface 121.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. An outlet cover, comprising:
   a cover plate removably connected to at least one electrical outlet and surrounding the at least one electrical outlet; and
   at least one shelf disposed on at least a portion of the cover plate to receive at least one of a plug and a mobile device thereon, wherein the at least one shelf comprises:
   a support surface movably disposed on at least a portion of the cover plate to receive at least one of the plug and the mobile device thereon, and
   a movable wall be movably disposed on at least a portion of the support surface to move from retracted against the support surface in a first position to extended away from the support surface in a second position, and move from extended away from the support surface in the second position to retracted against the support surface in the first position, such that the movable wall prevents movement of at least one of the plug and the mobile device while the movable wall is extended.

2. The outlet cover of claim 1, wherein the at least one shelf further comprises:
   a first support bracket movably disposed at a first end of the support surface to support the first end of the support surface while the support surface is extended; and
   a second support bracket movable disposed at a second end of the support surface to support the second end of the support surface while the support surface is extended.

3. The outlet cover of claim 2, wherein the first support bracket and the second support bracket extend the support surface away from the cover plate using a spring in response to depressing the support surface while the support surface is retracted against the cover plate.

4. The outlet cover of claim 1, wherein the support surface has an adhesive substrate disposed thereon to prevent movement of at least one of the plug and the mobile device off the support surface.

* * * * *